United States Patent [19]
Williams et al.

[11] Patent Number: 5,744,087
[45] Date of Patent: Apr. 28, 1998

[54] MEDICAL ARTICLES AND METHOD THEREFOR

[75] Inventors: Joel L. Williams, Cary, N.C.; Hugh T. Conway, Verona, N.J.

[73] Assignee: Becton, Dickinson and Company, Franklin Lakes, N.J.

[21] Appl. No.: 311,985

[22] Filed: Sep. 26, 1994

[51] Int. Cl.$^6$ ............................. B28B 3/06; B28B 5/00
[52] U.S. Cl. ................. 264/297.2; 264/294; 264/319; 264/331.13; 264/331.17
[58] Field of Search ................. 264/297.2, 294, 264/319, 331.13, 331.17

[56] References Cited

U.S. PATENT DOCUMENTS

| | | |
|---|---|---|
| 3,079,633 | 3/1963 | Fitz . |
| 3,335,458 | 8/1967 | Fitz . |
| 3,651,190 | 3/1972 | Fitz . |
| 3,988,401 | 10/1976 | Kasting et al. ............ 264/37 |
| 4,314,799 | 2/1982 | Amberg et al. ............ 425/296 |
| 4,327,052 | 4/1982 | Sauer ............ 264/512 |
| 4,575,522 | 3/1986 | Breach et al. ............ 523/220 |
| 4,795,671 | 1/1989 | Shiiki et al. ............ 428/209 |
| 4,959,402 | 9/1990 | Williams et al. ............ 524/99 |

FOREIGN PATENT DOCUMENTS

| | | |
|---|---|---|
| 2047107 | 1/1992 | Canada . |
| 410384 | 1/1991 | European Pat. Off. . |

*Primary Examiner*—David W. Wu
*Attorney, Agent, or Firm*—Richard E. Brown

[57] ABSTRACT

A medical article of a polymeric nonthermoplastic material and method therefor is made by a continuous compression molding method in which a predetermined quantity of the polymer is added sequentially to a series of molds on a track.

5 Claims, 1 Drawing Sheet

MEDICAL ARTICLES AND METHOD THEREFOR

BACKGROUND OF THE INVENTION

1. Field of the Invention

The present invention relates to polymeric articles, and more particularly relates to medical articles made from nonthermoplastic materials and to an economical method for making the articles.

2. Background

Molding is a process conventionally used in manufacture of polymeric articles. In molding processes, melted polymeric material is forced into a mold where it is held until it solidifies and can be removed in the shape of the mold. In injection molding, a polymer in solid form is fed into the heating chamber of a molding machine which has a capacity greater than that of the mold itself. The polymer is melted. An amount of solid polymer precalculated to fill the mold is then forced into the rear of the heating chamber by a plunger so that an equivalent quantity of melted polymer is extruded directly into a sprue, or main feed channel, that runs from the outer face of the heating chamber to a gate in a single cavity mold or to runners in a multiple cavity mold. Liquid polymer is forced through the sprue until the mold is completely filled. The rheological properties of the liquid polymer are of critical importance for ready flow through the sprue, gate and runners and for complete filling of the mold, and often are substantially altered by impurities or additives in the melt.

In all injection molding machines, some polymer remains in the sprue after the mold is closed, leaving a projecting piece or tab which must be removed after the product is ejected from the mold. Often, the tabs are simply discarded, or for reasons of economy, may be recovered and recycled. In either case the inefficiency and additional cost which results lead to reduced productivity from the mold.

In compression molding, an apparatus which resembles a waffle iron is used wherein melted polymer fills all mold cavities without passing through gates and runners. When all the cavities are filled, the mold is closed and heat and pressure are applied from a hydraulic press. While this process eliminates gates and runners, a surplus of polymer must be used to ensure total cavity fill. The heat and pressure cause the polymer to fill the cavity and cause spillage out into overflow grooves. Polymer in the grooves, like the tabs in injection molding, must be recycled or discarded. Compression molding, like injection molding, is inherently a batch process and is less efficient than injection molding, because a separate machine is required to separate the individual articles from the single large "waffle" which comes out of the compression mold.

Rotary compression molding is a recent development in which individual molds on the track of a continuously revolving platform are individually charged with a melt of thermoplastic material. Compression and heating of the thermoplastic in the mold by a plunger forms the desired article. The mold-plunger unit advances along the track and is opened when the article has solidified.

There is a need in the art for a process by which medical articles can be made economically and continuously with nonthermoplastic materials. This invention addresses this need.

SUMMARY OF THE INVENTION

A method for preparing a medical article includes continuous compression molding of a nonthermoplastic material. In the present disclosure, the term nonthermoplastic material is intended to include any polymer which cannot be processed by conventional thermoplastic techniques such as injection molding. The term continuous is intended to mean a process which does not require interruption of the process to add raw material or remove finished product, i.e., a non-batch process. A preferred method is rotary compression molding and a preferred nonthermoplastic material is high molecular weight polyethylene In another aspect of the invention, a medical article is made by the process of the invention Preferred articles are caps and stoppers for sample collection tubes and syringes.

Thus the invention provides a method for making medical articles from a nonthermoplastic material continuously instead of by batch. By the method of the invention, there is no article-to-article variation. The articles do not have any tabs or projections which must be removed, as is common in conventional injection or compression molding and which waste up to 20% of the plastic material. The method is highly efficient and allows for high productivity from the molding unit.

DETAILED DESCRIPTION

Figure 1:
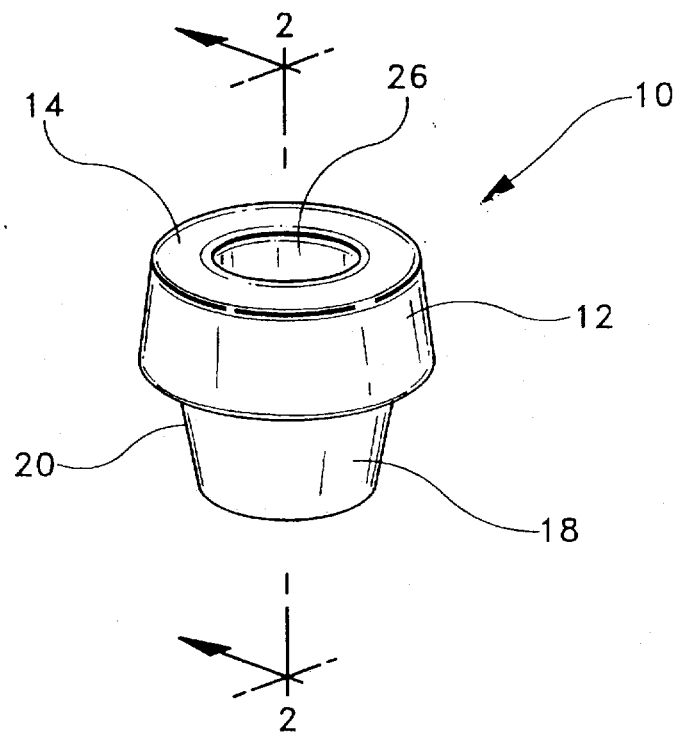
FIG. 1 is a perspective view of a cap for a sample collection tube.

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated and described. The scope of the invention will be measured by the appended claims and their equivalents.

Thermoplastic is an art term used to describe a polymer which may be repeatedly exposed to heat with return to its original condition on cooling. Thermoplastics are not crosslinked. In thermoplastic processing, a polymer is melt fabricated into an article without degradation of the polymer.

In contrast, a thermoset is a high polymer that solidifies or sets irreversibly when heated and cannot be melted without degradation, a property usually associated with crosslinking.

Elastomers have traditionally been defined as crosslinked thermosetting high polymers having the ability to be stretched to at least twice their length and then to recover rapidly to about their original length upon removal of the load. In contrast to elastomers, thermoplastics have poor recovery.

The nonthermoplastic material of the invention may be a thermoset or a crosslinked elastomer. The crosslinks may preferably be covalent, but also may be physical in nature consequent to Van der Waals or other intermolecular forces sufficiently strong to withstand applied mechanical stresses. Such physical crosslinks may be observed in block copolymerization or dynamic vulcanization technology.

Preferred nonthermoplastic materials for the invention are noncrosslinked polymers having molecular weights so high that degradation occurs on heating before the viscosity of the polymer is reduced sufficiently for continuous processing.

Nonthermoplastic materials of the invention characteristically have the consistency of gum rubber and cannot be forced through an extruder or the gates and runners of conventional injection molding equipment. In the art, this has often been described as refusing to turn corners, i.e. the material cannot be forced into the corners of a mold. Consequently, like metals, nonthermoplastic materials are conventionally fabricated by machining a solid block of material, as obtained from the polymerizer, with, for example, a lathe.

A representative but not exhaustive list of crosslinked nonthermoplastic materials suitable for making medical articles by the process of the invention includes styrene-butadiene and styrene-isoprene block copolymers, bromobutyl rubber, polyisoprene, polychloroprene, nitrile rubber, butyl rubber, ethylene propylene block copolymers, polysulfide rubber, crosslinked polyethylene, ethylene-propylene terpolymers, ethylene-vinyl acetate block copolymers, silicone rubber, and polyurethane rubber. Noncrosslinked materials which fall within the present definition of nonthermoplastic material and contemplated for the invention include polyolefins having a weight average molecular weight of 1,000,000 or more, preferably 2,000,000 to 10,000,000. The most preferred noncrosslinked nonthermoplastic materials are the materials conventionally known as ultra high molecular weight polyethylene and polypropylene having a molecular weight of about 4,000,000 to 10,000,000.

It has been found that nonthermoplastic materials may be fabricated into medical articles by continuous compression molding. In this process, the nonthermoplastic material is added sequentially to a series of molds, preferably preheated, moving along a track. Preferably each mold has the shape of the desired article, and a predetermined quantity of nonthermoplastic material sufficient to form one article is added to each mold as a solid or preferably as a heated gum. Pressure is conveniently applied with a plug which mates through an open top of the mold with the mold cavity, and the closed mold may optionally be heated to aid the nonthermoplastic material in assuming the shape of the mold and/or crosslinking the material. The closed mold is advanced along the track to a subsequent station where it is opened, the article removed, and a subsequent mold moved forward to receive nonthermoplastic material. A suitable apparatus for continuous compression molding of nonthermoplasts 1C materials is described in U.S. Pat. No. 4,314,799.

A representative list of medical articles contemplated by the present invention includes sample collection tubes and vials, tube holders, syringe plungers, stoppers, centrifuge tubes and caps, petri dishes, flasks and needle hubs. Preferred medical articles are syringe stoppers and stoppers for evacuated blood collection tubes.

If desired, the nonthermoplastic material may be formulated into a composition containing an additive which confers a particular property on the article. The nonthermoplastic material in granulated, pelleted or powdered form may be mixed with the additive by any conventional compounding procedure. Typical additives may be, for example, fillers, plasticizers and pigments. If the article is intended for radiation sterilization, a conventional mobilizing oil and/or hindered amine radiation stabilizer may be included in the composition. These additives are described in U.S. Pat. No. 4,959,402. A particularly useful hindered amine stabilizer is the hindered piperidine-polysiloxane ether available from Enichem Synthesis SpA, Milano, Italy under the trade name UVASIL™ 299.

If the article is intended for an application where clarity is desired, the composition may include a conventional sorbitol clarifying agent. Clarifying agents of the dibenzylidene sorbitol class are described in the aforementioned U.S. Pat. 4,959,402

Figure 2:
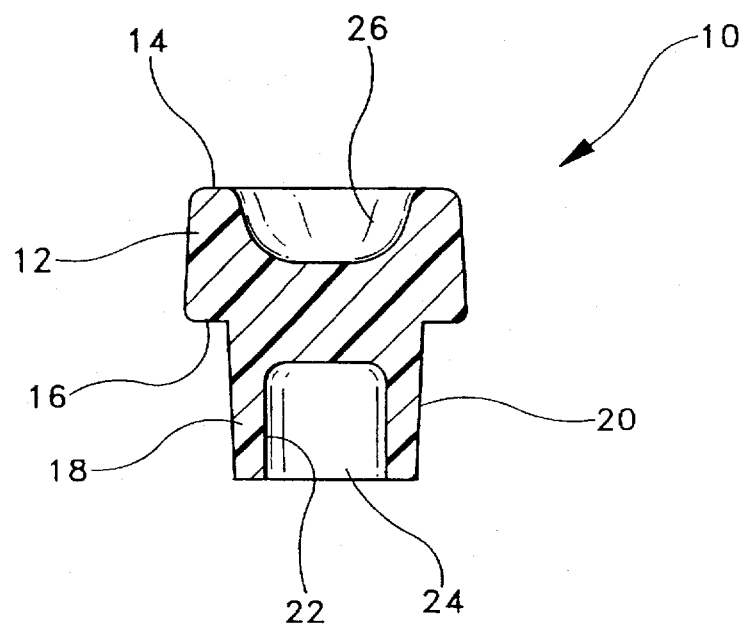
FIG. 2 is a vertical sectional view of the cap of FIG. 1 taken along the line 2—2 thereof.

A common feature of all medical articles of the invention is a wall surface formed when the nonthermoplastic material is forced against the side of a compression mold. FIGS. 1 and 2 illustrate a typical compression molded stopper 10 for a blood collection tube. Stopper 10 includes an annular upper portion 12 having a top wall 14. Upper portion 12 has lower wall or lip 16 which extends over the top edge of a tube (not shown in the drawings). Stopper 10 also includes a lower annular portion or skirt 18. Skirt 18 has an outside wall 20 which forms an interference fit with the inside wall surface of the tube and maintains the stopper in the tube. Skirt 18 also has an inside wall surface 22 which defines a well 24. Top wall 14 defines a cavity 26. A septum 28 separates well 24 and cavity 26 and is punctured by a cannula (not shown) when the stopper and associated tube are being used for drawing a blood sample.

What is claimed is:

1. A method for preparing a medical article comprising:
   a) depositing a nonthermoplastic polymer selected from the group consisting of a crosslinked polymer and a noncrosslinked polyolefin having a weight average molecular weight of 1,000,000 or more into a mold of a continuous compression molding apparatus;
   b) applying heat and pressure to said nonthermoplastic polymer in the mold whereby an article having the shape of the mold is formed in the mold; and
   c) removing said article from the mold.

2. The method of claim 1 wherein said nonthermoplastic polymer is a component of a composition which further comprises an additive.

3. The method of claim 1 wherein said article is a syringe stopper.

4. The method of claim 1 wherein said article is a stopper for a sample collection tube.

5. A method for preparing a medical article comprising:
   a) depositing a predetermined quantity of a nonthermoplastic polymer selected from the group consisting of a crosslinked polymer and a noncrosslinked polyolefin having a weight average molecular weight of 1,000,000 or more into the cavity of a first compression mold having an open top, said cavity having the shape of a medical article;
   b) forming a closed compression mold by deploying a plug dimensioned to mate with said first mold through said open top, said plug applying pressure to said non-thermoplastic polymer and causing said polymer to fill said cavity and form a medical article having the shape of said cavity in said closed mold;
   c) advancing said closed mold along a track whereby a second compression mold moves into position to receive a predetermined quantity of said nonthermoplastic polymer; and
   d) removing said article from said first mold.

* * * * *